June 4, 1935.  P. WILSING  2,003,795
CLUTCH AND BRAKE MECHANISM FOR WINCHES
Filed July 14, 1930
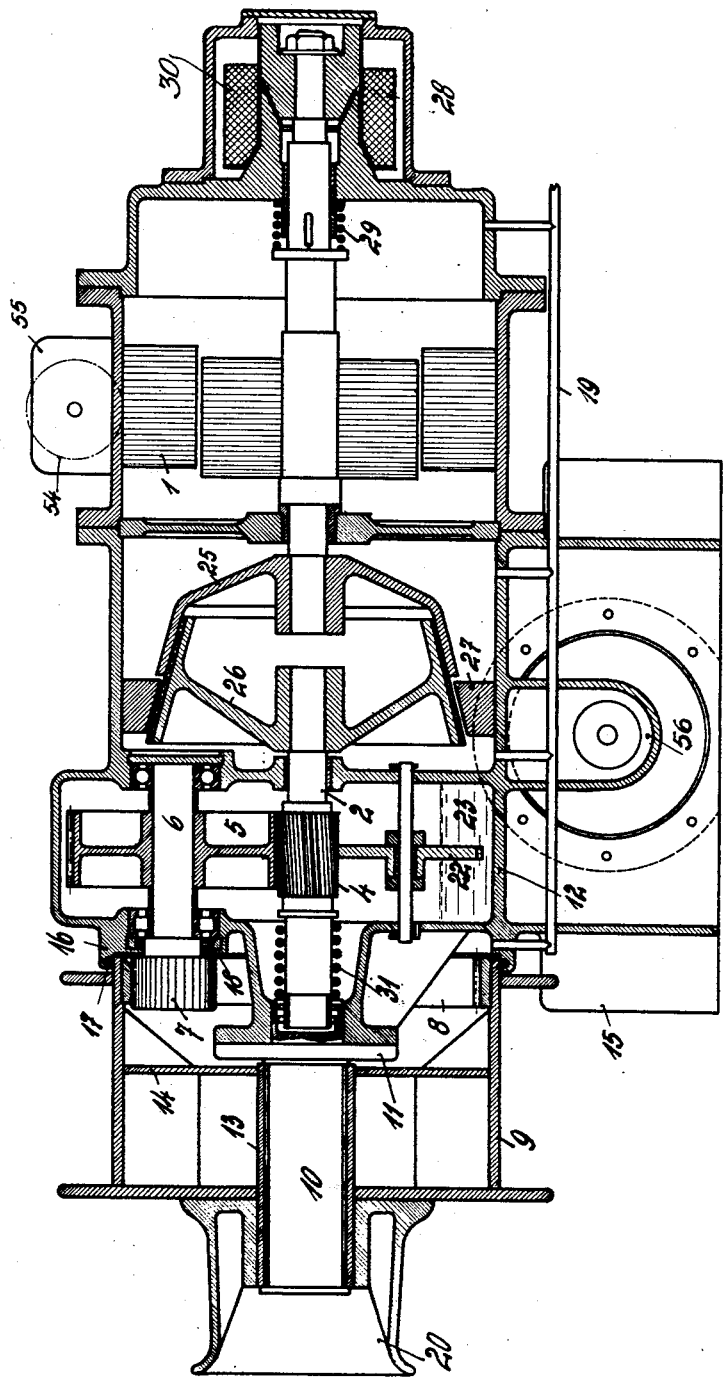
Inventor
P. Wilsing:
by
W. E. E------:
Attorney.

Patented June 4, 1935

2,003,795

UNITED STATES PATENT OFFICE 2,003,795

CLUTCH AND BRAKE MECHANISM FOR WINCHES

Paul Wilsing, Duisburg, Germany, assignor to Demag Aktiengesellschaft, Duisburg, Germany Application July 14, 1930, Serial No. 467,814
In Germany July 19, 1929

5 Claims. (Cl. 192—18)

The invention relates to a winch, more especially for use on ships. Such winches must be water-tight, very compact in design and very simple to operate. According to the invention, the compactness of structure is obtained, not by the employment of gear mechanism of low efficiency or with inaccessible members, but by an extremely open arrangement of the parts, which at the same time renders the winch water-tight. The gear casing acts as support for the one-bloc winch to which is secured on the one hand the independent driving motor, together with the axially movable clutch, while on the other hand, the rope drum is connected to the gearing, either parallel or in axial alignment with the motor. The winch is rendered water-tight without the use of stuffing boxes, the motor flange and the drum journal including the drum being employed for sealing the gear casing.

The clutch and the gear brake are likewise fully enclosed, and they can be combined to form a unit, in such manner that the bringing of the clutch into action automatically releases the brake. The device is illustrated in the accompanying drawing which illustrates the winch according to the invention in longitudinal section.

The motor 1 drives the gear shaft 2, which carries the motor pinion 4 gearing with an intermediate pinion 5 on the countershaft 6. A further pinion 7 is mounted on the countershaft 6 and engages with the internal teeth 8 of the drum 9. The drum 9 rotates on a journal 10 attached at 11 to the flange of the gear casing 12. The drum 9 is secured, as by welding, to its hub 13 by one or more solid plates 14.

All the parts of the winch are carried by the gear casing 12, which is provided with feet 15 for securing the winch to a suitable base. The gear-casing is made air-tight on the right hand side, by attaching the motor directly thereto, so that labyrinth packing is unnecessary. On the other side the gear casing is closed by the flange 11 of the journal 10. The part of the gear transmission outside the gear casing, consisting of the pinion 7 and the internal teeth 8, is enclosed in a chamber which is formed, on one side by the left wall of the casing and on the other side by the plates 14 of the drum 9. To ensure better sealing, a flange 16 on the gear casing 12 projects round the end of the drum for packings 17. Sea water cannot penetrate into the gear casing 12 either at the flange 11 or at the countershaft 6 which is provided with packing 18. At the lower end of the flange 16 is a drain tube 19 which carries any seepage water away through a pipe the mouth of which is protected against the penetration of sea water and damp air. If required by working conditions, a capstan 20 may be attached to the drum 9, being advantageously keyed directly to the hub 13 of the drum 9.

Lubrication of the pinions 4 and 5 is effected by means of a wheel 22, which dips into the oil sump 23 in the lower part of the gear casing 12, thus producing effective and economical lubrication. The oil is not forced out of the gear casing by excessive pressure.

The motor is connected with the gearing by means of a clutch 25, which engages with a cone 26 on the gear shaft 2. This cone is of such width that it can act in co-operation with a fixed braking surface 27. The clutch is actuated by an electromagnet 28 which is mounted directly on and in axial alignment with, the motor casing. It is not however in the motor circuit but can be switched on and off independently of the motor. When the motor and gearing are out of operation, the cone 26 bears against the braking surface 27 and the clutch 25 bears against the cone 26 and is also braked against the surface 27.

If the motor and magnet are now switched on together, the magnet attracts the core during the starting of the motor, and draws the core and the motor shaft towards the left, thus releasing the brake 26, 27 and throwing into action the coupling 25, 26. The motor shaft thus acts as a brake and coupling rod. The load is now raised or lowered according to the direction of rotation of the motor. When the magnet is switched off the cone 26 immediately bears against the braking surface 27 under the pressure of the spring 31 or as the result of the axial pressure component of the helical toothed pinion 4; and the revolving parts of the motor are also braked against the cone 26 under the pressure of a small spring 29. The spring 31 acts as the means for applying a brake for the empty hook, and the axial pressure of the pinion 4 sets up a braking pressure which is proportional to the load.

It will be understood that although the cone 25 is maintained always in contact with the cone 26 by the spring 29 when the magnet is inoperative, the pressure between the two parts is not sufficient to transmit the torque of the motor but when the magnet is energized to move the cone 26 out of contact with the brake ring 27 the engagement of the cone 25 with the cone 26 is such as to permit the transmission of the full torque of the motor.

I claim:

1. A winch comprising a motor with armature shaft that is axially movable and a transmission gear, a coupling between said motor and said gearing and a brake with which said coupling co-operates so that the brake is not released till the coupling transmits the full turning moment, and a stationary electromagnetic coil disposed axially with respect to the motor shaft and adapted to control in common the operation of the brake and coupling by axial movement of the armature shaft.

2. In a winch, a motor and transmission gearing each provided with axially movable shafts, coupling members respectively upon the said shafts, a brake surface with which the coupling member upon the gearing shaft co-operates a magnet co-axial with the motor shaft and adapted to move said shaft axially to control the coupling and the brake and a spring to move the gearing shaft to render the brake effective when the magnet is de-energized.

3. In a winch according to claim 2, a magnet core upon said motor shaft which core is responsive with the energization of the magnet, the said motor shaft serving as a coupling and brake rod.

4. A winch comprising a motor and transmission gear, a coupling between said motor and said gearing, and a brake with which said coupling co-operates so that the brake is not released until the coupling transmits the full turning moment, an electro-magnetic coil disposed axially with respect to the motor shaft and adapted to control in common the operation of the brake and coupling, and an oil free enclosed chamber disposed between the motor and the gearing in which chamber are provided the coupling and the alternately operating brake for the purpose of maintaining the frictional surfaces of the coupling and of the brake free from oil.

5. A winch comprising a motor, a transmission gear, a coupling device between said motor and said gear, a brake device with which said coupling device co-operates, said brake device and said coupling device comprising pairs of frictional surfaces so related that movement of a surface of one device effects movement of a surface of the other device on movement of the second surface of the first device, and a stationary electromagnetic coil disposed axially with respect to the motor shaft and adapted to control in common the operation of the brake and coupling devices.

PAUL WILSING.